JOHNSON & MILSOM.
Grain Drier.
No. 90,847.
Patented June 1, 1869.
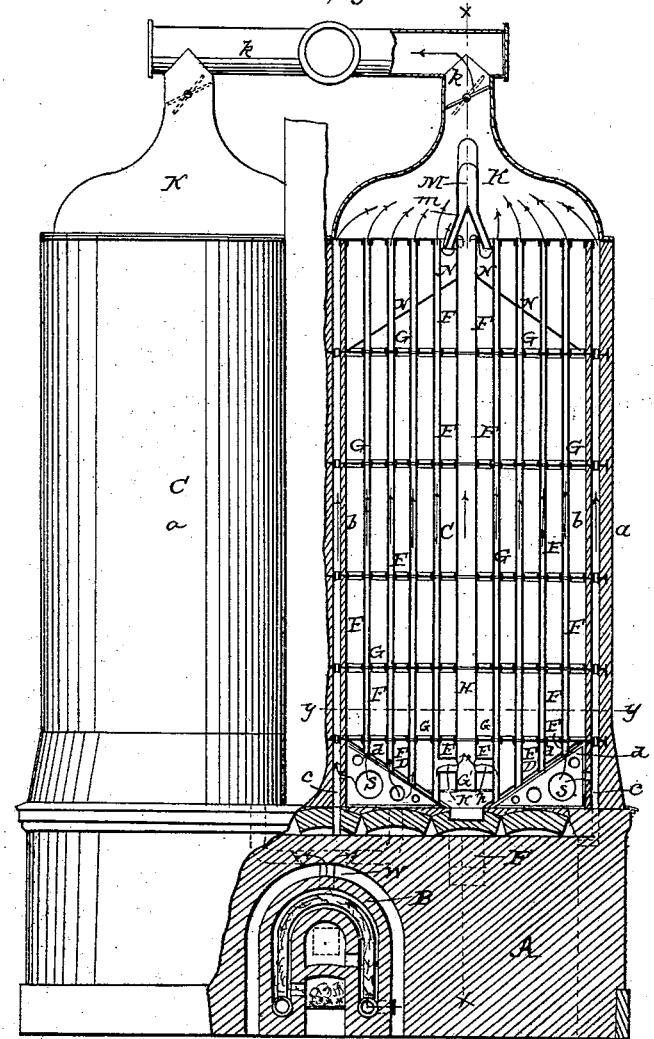
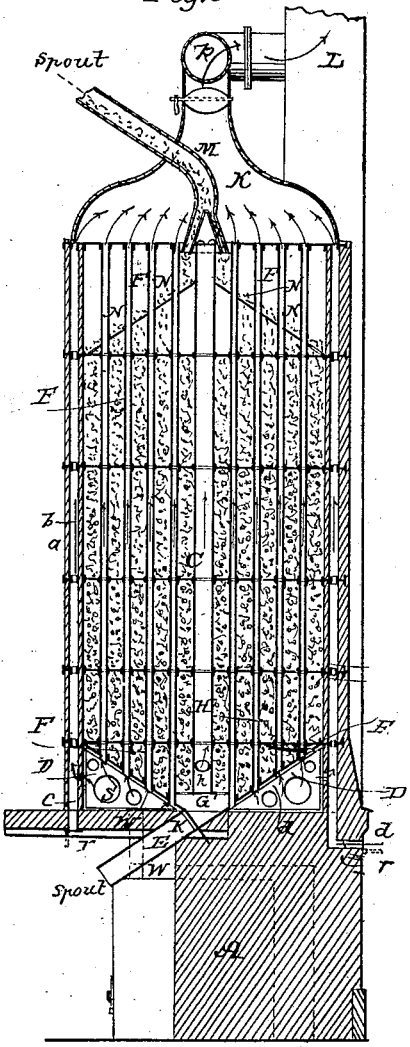
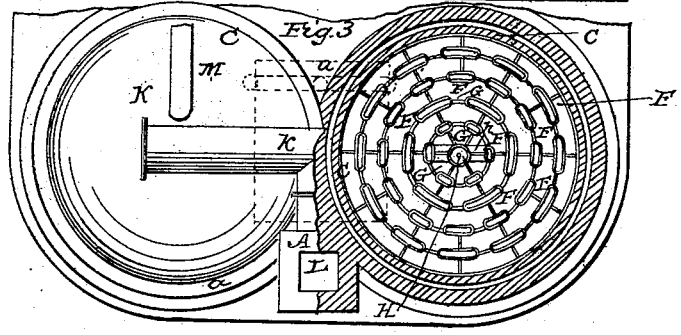
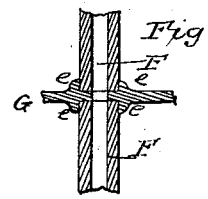
INVENTORS
Geo. H. Johnson
George Milsom

United States Patent Office.

GEORGE H. JOHNSON AND GEORGE MILSOM, OF BUFFALO, NEW YORK.

Letters Patent No. 90,847, dated June 1, 1869.

---

IMPROVEMENT IN GRAIN-DRIERS.

---

The Schedule referred to in these Letters Patent and making part of the same.

---

*To all whom it may concern:*

Be it known that we, GEORGE H. JOHNSON and GEORGE MILSOM, of Buffalo, in the county of Erie, and State of New York, have invented a new and useful Method of Drying and Renovating Grain and improved apparatus for accomplishing the same; and we do hereby declare the following to be a full and exact description thereof, reference being had to the accompanying drawings forming a part of this specification, in which—

Figure 1 is an elevation of a double kiln, constructed and arranged for drying grain according to our invention, one bin thereof being in section to illustrate the interior construction thereof.

Figure 2, a central vertical section in the line $x\,x$ of fig. 1.

Figure 3, a top view of our kiln, with a transverse section through one of the bins, in the line indicated at $y\,y$ of fig. 1.

Figure 4, a detached sectional view, illustrating the joints of the porous ventilating-tubes, with the iron frame-work sustaining them.

The red arrows, in figs. 1 and 2, indicate the course of the hot-air currents through the kiln.

Similar letters indicate like parts in all of the figures.

The nature of our invention consists in passing, through a mass of moist grain in bulk, a number of air-conducting tubes or pipes, made of some porous material, for the purpose of absorbing and carrying off the moisture therefrom by means of currents of hot, dry air, passing through said tubes or pipes, and for the purpose, also, of cooling and ventilating the grain by means of cold-air currents forced through said tubes.

And it relates especially to the combination of porous air-conducting tubes or pipes, with the interior of grain-receptacles, for the purpose of drying and ventilating grain placed in bulk around and about said tubes.

We contemplate the application of our invention to all descriptions of grain-receptacles.

In the following specification, however, we will describe one of the best forms of bins specially adapted, by our improvements, to the drying and renovation of grain, as well as to its storage.

Upon a suitable foundation, A, of masonry-work, enclosing a furnace-chamber and furnace, B, we build one or more cylindrical structures or bins, C, each with an outer wall, $a$, of brick or stone, and an inner, thinner wall, $b$, of brick, or, by preference, of the improved hollow tiles which we have invented for the purpose, and made the subject of a separate application for Letters Patent, bearing even date herewith.

A narrow air-space, $c$, is left between the outer and inner walls, to ventilate the interior grain-space, and maintain an even temperature therein.

Each cylinder, or bin, is fitted with a close "false," or double bottom, D, (figs. 1 and 2,) of metal, made in the form of an inverted cone, having its apex at the centre, and its sides radiating therefrom at an angle of about forty-five degrees to the inner wall of the bin, wherewith it forms a tight joint.

This conical bottom D, terminates centrally in a spout, E, (fig. 2,) arranged to discharge and carry off the grain from the cylinder, and it is pierced with series of elongated apertures, in concentric circles, each aperture being encircled by upwardly-projecting flanges, $d\,d$.

The hot-air flues W, from the furnace, terminate in the annular space enclosed beneath the conical bottom-plate D.

Upright perforated partition-plates S, may be used to support the bottom-plate D.

Upon the flanged apertures $d\,d$, of the plate D, are fitted porous earthen or clay tubes, or pipes, F, (figs. 1, 2, 3, and 4.) suitably tempered, and hardened, each having an elongated section, (as illustrated in fig. 3,) to correspond with the apertures upon which they are fitted. They may be made of a circular or angular section, but we prefer them oblate, as represented.

These porous tubes F, are made in sections, or short lengths.

The first tier of sections, fitted upon the conical bottom D, is so graduated in length, and arranged thereon, as that its upper ends shall all terminate in the same horizontal plane, (see figs. 1 and 2,) and be secured by flanged metallic rims $e\,e$, fig. 4, fitting upon its upper ends, said flanged rims being united and connected by horizontal bars G, in lines radiating from the centre, so as to constitute an open frame.

The flanged rims $e\,e$, encircling the upper ends of the lower section of the tubes F, form seats to receive and encircle the lower ends of the next sections, whose upper ends are secured and united by another and similar metallic frame G. Thus the tubes are continued by sections, secured at either end by open metallic frames, in the top of the bin.

The tubes may be built or set up by sections at the same time with the outer walls in the construction of the drying-bins. In such case the supporting-frames G, are so extended as to be built into the outer walls $a$, (figs. 1 and 2,) thus imparting great solidity and strength to the entire structure.

In the centre of the cylindrical bins C, we place an enlarged tube H, closed at its lower end. (See figs. 1 and 2.) This lower end rests upon a small frame, G', a short distance above the opening of the discharging-spout E.

Short connecting-tubes, h h, are inserted at points above the bottom of the central tube, into the same, to connect it with the next adjacent sectional tubes, F, which communicate with the hot-air flues beneath.

The central tube H, may be built up in sections, supported by the metallic frames, as are the smaller tubes, arranged concentrically about it.

The vertical tubes or flues, E F F, in the bins C, all terminate and open out at the top or upper end of said bins.

The bins C, are covered with suitable domes, or roofs, K, made, by preference, of sheet-metal. These domes or roofs, terminate each in a ventilating-pipe, or flue, k, communicating with an outer chimney, L, (figs. 2 and 3,) to carry off the vapor escaping through the vertical flues of the bins.

A suitable feeding, or supply-pipe, M, fig. 2, to supply grain to the bin, extends through the roof thereof, to a central point in the top of the bin, where it opens out with an enlarged mouth over the upper end of the central tube, H, which, however, is so covered and protected by a cap, m, as that no grain may drop down therein.

A conical sieve, N, encircling the central tube H, slopes radially at an angle of about forty-five degrees from a point just below the upper end, outwardly to the sides of the bin, so that all grain pouring in through the supply-pipe M, shall be evenly distributed from centre to circumference in the bin.

The supply of hot air to the space under the bottom-plate D, of the bin, and thence to the porous flues F, passing up through the grain, is regulated by means of suitable dampers in the flues W.

The admission of cold air to the flues and ventilating-spaces C, between the outer and inner walls a and b, of the bin, is also controlled by suitable valves, closing air-ducts communicating with said flues and spaces, (as at r, fig. 2.)

Our improved bins, C, constructed and arranged as described, are filled with grain through the feeding-spouts, or pipes M. The grain falling from the mouth of the spout M, into the bin, upon its conical top sieve N, is thereby distributed evenly from the centre outwardly to the wall of the bin, and will fall equally between all the ventilating-tubes F F, therein.

The frames G, supporting the several sections of the ventilating-tubes F, are made so open as to offer no obstacle to the descent of the grain through the bin. When the bins have been thus filled with moist grain, hot air is admitted through the flues W, from the furnace B, into the space beneath the bottom-plate D. This hot air is here distributed to the porous flues F, and to the open space c, surrounding the bin, and, passing through the same to the dome K, finally escapes through the pipe k, to the chimney L.

The currents of hot air thus flowing through the space c, around the bin C, and also through the porous tubes F, in the mass of the moist grain therein, will not only rapidly and thoroughly heat the bin and its contents, but by creating a strong upward draught in each of the porous flues, will cause an inward draught or suction through each and every pore of the tubes, to draw and carry off the moisture from the heated grain. So soon as the grain is dried, it may be rapidly cooled by forcing cold air through the tubes.

The entire contents of the bins may be withdrawn therefrom, at pleasure, by means of the discharging-spout E, which is closed by suitable valve or gate, R, fig. 2.

By the use of the porous tubes F, all the disadvantages attendant upon the contact of moist and heated grain with a metallic surface, or directly with the hot air and gases from the furnaces, as in the ordinary forms of grain-driers, are avoided, all danger of parching the grain prevented, and the grain is left perfectly sweet and pure after being dried.

Our improved drying-bins, constructed as described, are admirably adapted to the storage of grain in bulk, and may be so used when not employed in the treatment of the grain.

Having thus fully described our invention,

We claim therein as new, and desire to secure by Letters Patent—

An apparatus for drying and renovating grain, constructed of a chamber, or bin, C, permeated by a system of porous flues, F, communicating with a furnace, B, below, and a chimney, or escape-vent, L, above, all substantially in the manner, and for the purpose herein set forth.

The foregoing specification of our improvements in the construction of grain-drying and renovating bins, signed by us, this 24th day of November, A. D. 1868.

GEO. H. JOHNSON.
    GEO. MILSOM.

Witnesses:
 I. C. BAKER,
 GEO. M. HARVEY.